(12) United States Patent
Kahn et al.

(10) Patent No.: US 11,524,716 B2
(45) Date of Patent: Dec. 13, 2022

(54) ELECTRIC TRUCK STEERING WITH VARYING PUMP SPEED

(71) Applicant: PACCAR Inc, Bellevue, WA (US)

(72) Inventors: William Kahn, Denton, TX (US); Ed Legler, Denton, TX (US)

(73) Assignee: PACCAR Inc., Bellevue, WA (US)

( * ) Notice: Subject to any disclaimer, the term of this patent is extended or adjusted under 35 U.S.C. 154(b) by 352 days.

(21) Appl. No.: 16/909,341

(22) Filed: Jun. 23, 2020

(65) Prior Publication Data

US 2021/0394822 A1 Dec. 23, 2021

(51) Int. Cl.
*B62D 5/065* (2006.01)
*B62D 1/16* (2006.01)
*B62D 6/08* (2006.01)
*B62D 6/02* (2006.01)
*B62D 5/06* (2006.01)

(52) U.S. Cl.
CPC .............. *B62D 5/065* (2013.01); *B62D 1/16* (2013.01); *B62D 5/064* (2013.01); *B62D 6/02* (2013.01); *B62D 6/08* (2013.01)

(58) Field of Classification Search
CPC . B62D 1/16; B62D 5/04; B62D 5/064; B62D 5/065; B62D 6/02; B62D 6/08
USPC .............................................. 180/421; 701/54
See application file for complete search history.

(56) References Cited

U.S. PATENT DOCUMENTS

2010/0056326 A1* 3/2010 Kahn .................... B60W 10/10
477/3

OTHER PUBLICATIONS

ZF Commercial Steering—Formerly TRW, "ZF TRW ActivMode Energy Efficient Power Steering Pump", YouTube video: https://www.youtube.com/watch?v=iFNlyDB9xlQ, visited online on Sep. 23, 2020, 2:23 playtime, posted Dec. 1, 2015, 2 pages.

* cited by examiner

*Primary Examiner* — Kevin Hurley
*Assistant Examiner* — Felicia L. Brittman
(74) *Attorney, Agent, or Firm* — Merchant & Gould P.C.

(57) ABSTRACT

The present technology describes systems and methods for varying a pump speed of an electric truck. In examples, vehicle efficiency losses may be reduced by varying the speed of a hydraulic pump associated with a power steering gear. An electronic control unit (ECU) may receive a set of steering information from a torque overlay system (TOS). Based on the set of steering information, a power may be provided to a variable pump motor. The power provided to the variable pump motor may correspond with a speed of a hydraulic pump associated with a power steering gear of the vehicle. As new or additional steering information is received from the TOS, the ECU may adjust the power provided to the variable pump motor.

20 Claims, 5 Drawing Sheets

ELECTRIC TRUCK STEERING WITH VARYING PUMP SPEED

INTRODUCTION

Additional steering assistance is often required to maneuver a vehicle in addition to a manual torque applied to a steering wheel by a driver. The advent of power steering columns and torque overlay systems have aided steering capabilities by applying additional torque on the steering column to better turn the wheels of the vehicle. A power steering system of vehicle is often powered by a hydraulic pump. The hydraulic pump may be powered by a motor. The use of a hydraulic pump, however, typically requires the pump to continuously run while the vehicle is on, even when additional steering assistance is not needed.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

The present technology relates to reducing efficiency losses associated with continuously running a hydraulic pump to provide steering assistance via a power steering gear. In an aspect, the present technology relates to a system for varying a power provided to a hydraulic pump of a vehicle. The system includes a steering column comprising a torque overlay system; a variable pump motor hydraulically coupled to a hydraulic pump, the hydraulic pump configured to provide fluid to a power steering system; a power generator; a processor communicatively coupled to the torque overlay system; and memory storing instructions, that when executed by the processor, cause the system to perform a set of operations. The set of operations include receiving, from the torque overlay system, a first set of steering information. The set of operations further include determining a first motor power of the variable pump motor, based on the first set of steering information. Additionally, the set of operations includes causing the first motor power to be provided to the variable pump motor from the power generator.

In an example, the set of operations further includes receiving, from the torque overlay system, a second set of steering information; determining a second motor power of the variable pump motor, based on the second set of steering information; and causing the second motor power to be provided to the variable pump motor from the power generator, wherein the second motor power is different from the first motor power. In another example, the set of operations further includes receiving, from the torque overlay system, a third set of steering information; determining not to power the variable pump motor, based on the third set of steering information; and preventing powering of the variable pump motor. In a further example, the first set of steering information includes at least one of: a speed of the vehicle; an angle of rotation of a steering wheel of the vehicle; a manual torque applied to the steering column from the steering wheel; or a rotational speed of the steering wheel. In yet another example, the first set of steering information includes the speed of the vehicle, and wherein the first motor power increases as the speed decreases. In still a further example, the first set of steering information includes the angle of rotation of the steering wheel, and wherein the first motor power increases as the angle of rotation increases. In another example, the first set of steering information includes the manual torque applied to the steering wheel, and wherein the first motor power increases as the manual torque increases. In a further example, the processor is electrically coupled to the power generator and the variable pump motor.

In another aspect, a method of varying a speed of a hydraulic pump in a vehicle is disclosed. The method includes causing a first motor power to be provided to a variable pump motor of a hydraulic pump of a vehicle from a power generator of the vehicle. The method further includes receiving, from a torque overlay system, a first set of steering information associated with the vehicle. Based on the first set of steering information, the method determines a second motor power of the variable pump motor. The method further includes causing the second motor power to be provided to the variable pump motor from the power generator, wherein the second motor power is different from the first motor power.

In an example, the first motor power and the second motor power are provided while the power generator of the vehicle is on. In another example, the second motor power is zero. In a further example, the first set of steering information includes at least one of: a speed of the vehicle; an angle of rotation of a steering wheel of the vehicle; a manual torque applied to the steering column from the steering wheel; or a rotational speed of the steering wheel. In yet another example, the vehicle is an electric truck and the power generator is an electric battery. In still another example, the method further includes: receiving, from the torque overlay system, a second set of steering information; determining a third motor power of the variable pump motor, based on the second set of steering information; and causing the third motor power to be provided to the variable pump motor from the power generator. In another example, determining a second motor power includes identifying the second motor power based on a set of pre-determined rules. In a further example, the method further includes updating the set of pre-determined rules based on the first set of steering information.

In a further aspect, a vehicle capable of varying a speed of a hydraulic pump is disclosed. The vehicle includes a front axle coupled to a wheel; a power generator; a steering column coupled to the front axle comprising a torque overlay system; a variable pump motor hydraulically coupled to a hydraulic pump, the hydraulic pump configured to provide fluid to a power steering system; a processor communicatively coupled to the torque overlay system; and memory storing instructions, that when executed by the processor, cause the system to perform a set of operations. The set of operations include causing a first motor power to be provided to the variable pump motor from the power generator. The set of operations also includes receiving, from the torque overlay system, a set of steering information. Additionally, the set of operations includes determining a second motor power of the variable pump motor, based on the set of steering information. The set of operations includes causing the second motor power to be provided to the variable pump motor from the power generator, wherein the second motor power is different from the first motor power.

In an example, the set of operations is performed when the power generator of the vehicle is on, and wherein the first motor power is zero. In another example, the processor is electrically coupled to the power generator and the variable pump motor. In yet another example, the vehicle is an electric truck and the power generator is a battery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

Figure 1:
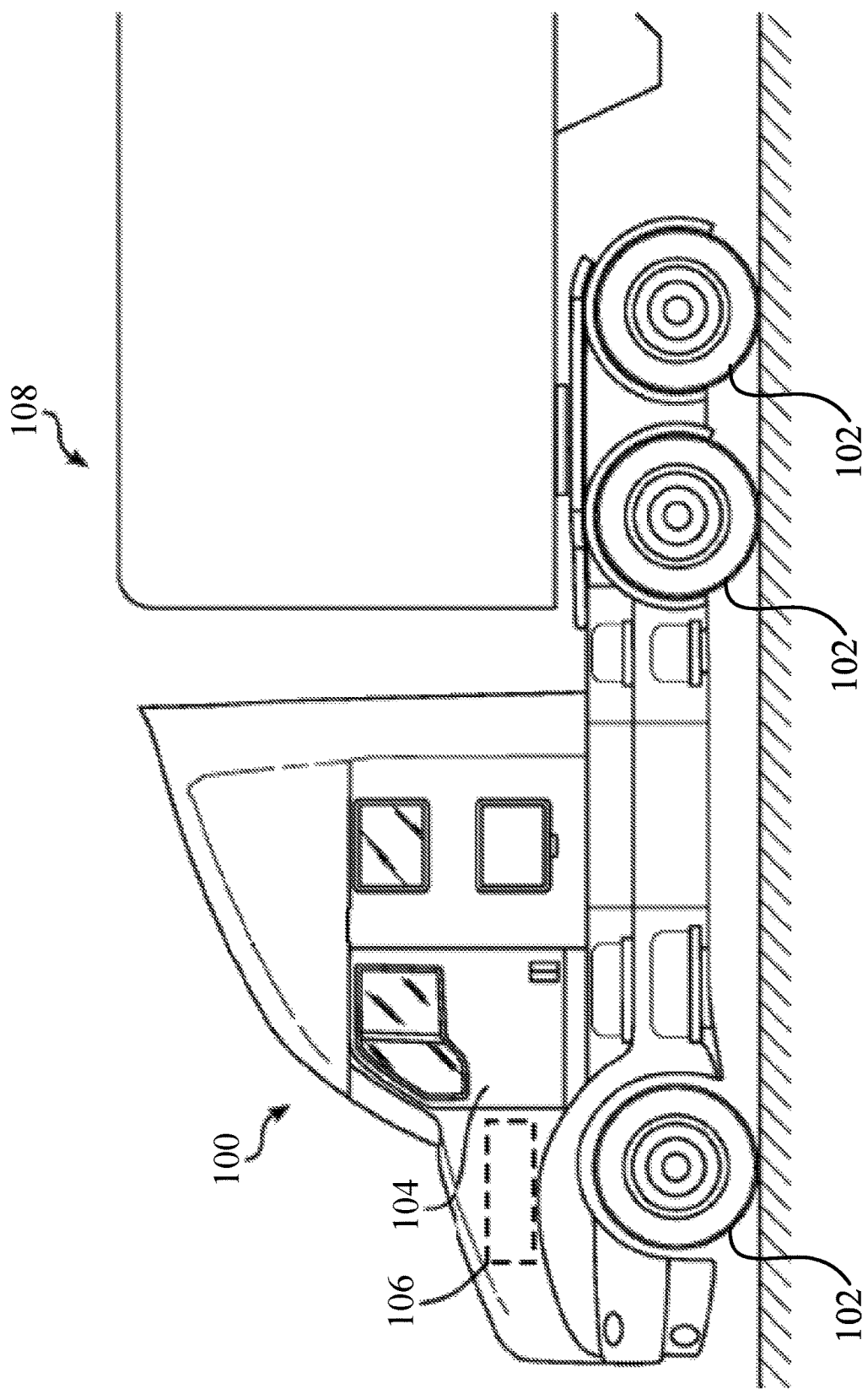
FIG. 1 depicts a side view of a vehicle.

While examples of the disclosure are amenable to various modifications and alternative forms, specific aspects have been shown by way of example in the drawings and are described in detail below. The intention is not to limit the scope of the disclosure to the particular aspects described.

DETAILED DESCRIPTION

As discussed above, vehicles have a power steering gear coupled to a steering column to assist in maneuvering the vehicle by applying additional torque to the steering column (referred to herein as a pump torque). Traditionally, the hydraulic pump is continuously running while the vehicle is on, even when the power steering assist is not necessary to steer the vehicle. When the hydraulic pump is running at a speed different from what is needed to assist the power steering column, a variety of vehicle inefficiencies may result. For example, when the speed of the hydraulic pump is faster than the speed required or desired to maneuver the vehicle, the engine may experience decreased fuel efficiency (e.g., for a combustion engine) and/or a battery may experience a decrease in charge or battery life (e.g., for an electric vehicle). Alternatively, when the speed of the hydraulic pump is slower than the speed required or desired to maneuver the vehicle, the vehicle may experience control issues (e.g., difficultly and/or inability to turn the wheels of the vehicle sufficiently).

As such, the present technology provides systems and methods that, in part, reduce efficiency losses (e.g., fuel efficiency and/or battery efficiency) associated with a hydraulic pump to apply a pump torque to a steering column of a vehicle. To do so, examples of the present technology provide systems to vary pump speed of a hydraulic pump applying hydraulic pressure to a power steering gear on a vehicle's steering column. As an example, a processor may indirectly or directly control the speed of the hydraulic pump, as required or desired, based on steering information received from a torque overlay system and/or a central vehicle control system. With these concepts in mind, several examples of varying pump speed of a steering column are discussed, below.

FIG. 1 depicts a side view of a vehicle 100. In the example depicted, the vehicle 100 is a truck with a chassis supported by wheels 102. As such, the vehicle 100 is turned or maneuvered by rotatable wheels 102. The vehicle 100 may be a part of a tractor-trailer combination, which may include the vehicle 100 having a so-called fifth wheel by which a box-like, flat-bed, or tanker semi-trailer 108 (among other examples) may be attached for transporting cargo or the like. While the vehicle 100 is depicted as a truck in FIG. 1, it should be appreciated that the present technology is applicable to any type of vehicle where variable pump speed of a hydraulic pump applying pump torque to the steering column is desired.

The example vehicle 100 includes a cabin 104 from which a driver may steer the vehicle 100 by rotating or applying manual torque to a steering wheel. The steering wheel is coupled to the wheels 102 via a steering column. The steering column may be included in a pump control system 106 of the vehicle 100. According to the present technology, the pump control system 106 may also include a torque overlay system, a battery, a processor, a pump motor, a hydraulic pump, and a power steering gear. The components and operations of example pump control systems are discussed in further detail, below.

Figure 2:
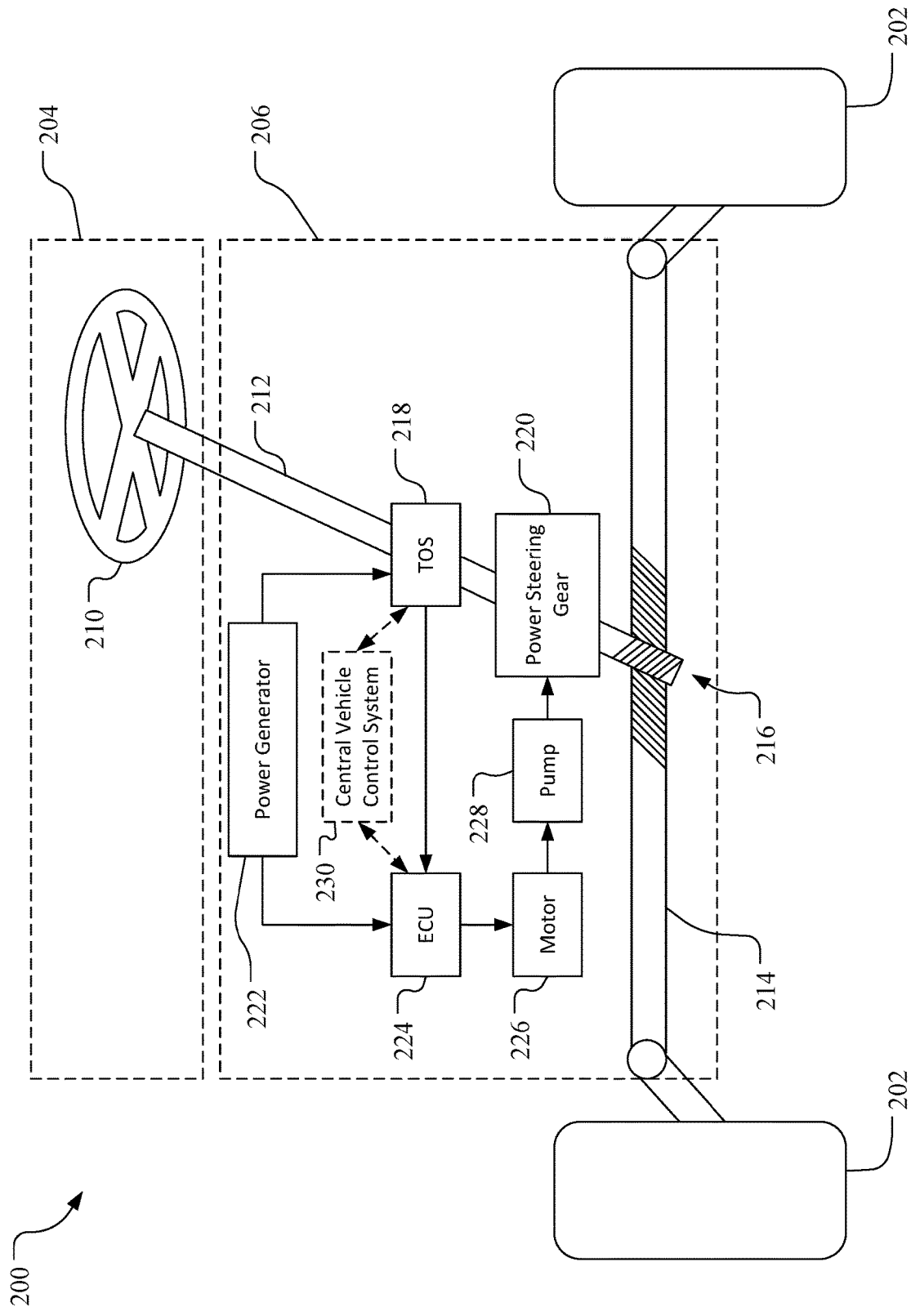
FIG. 2 depicts a schematic of an example system of the present technology for varying a pump speed associated with power steering of a vehicle.

FIG. 2 depicts a schematic of an example system 200 of the present technology for varying a pump speed associated with a pump control system 206 of a vehicle. As described herein, the vehicle may include wheels 202, a cabin 204, and a pump control system 206. To control the vehicle, the wheels 202 supporting the vehicle may be turned. In an example, the vehicle may be autonomous or semi-autonomous and may not include a steering wheel 210. In an example where the vehicle includes a steering wheel 210 inside the cabin 204, a driver of the vehicle may rotate or apply a manual torque to a steering wheel 210 of the vehicle to change direction of the wheels 202. In an example, a steering column 212 may couple to the steering wheel 210. The steering column 212 may further extend through the pump control system 206 to couple to a rack 214 at a pinion 216. The rack 214 may couple to the wheels 202 (e.g., with a roller bearing and/or a tie rod). Thus, the steering wheel 210 is coupled to the wheels 202 by at least the steering column 212 and the rack 214. In an example, a force exerted by the driver of the vehicle on the steering wheel 210 may not be enough unassisted force to turn the wheels 202. In another example, torque and/or rotational movement may rotate the steering column 212 to convert to translational movement of the rack 214 at the pinion 216. As an alternative to the rack 214 and pinion 216 system, the vehicle may include a recirculating ball steering gear. In an example, a recirculating ball steering gear may include ball bearings around a worm drive and a recirculation channel that, as the steering wheel 210 is rotated, rotates a nut along the worm drive to turn the wheels 202.

The pump control system 206 may include a variety of components to aid or assist in vehicle steering, including a torque overlay system ("TOS") 218, a power steering gear 220, a power generator 222, an electronic control unit ("ECU") 224, a motor 226, and a pump 228. The TOS 218 may include magnetic actuator (or other device) overlaid on, or coupled to, the steering column 212 to augment, replace, or otherwise affect the manual torque exerted by a driver on the steering wheel 210. For example, the TOS 218 may independently apply a TOS torque based on the state of the vehicle. In examples, this may include applying a TOS torque to lessen the manual torque required of the driver in certain situations (e.g., to keep the vehicle moving straight in a crosswind). For example, the TOS 218 may process steering information to apply more or less TOS torque on the steering column 212 than applied on the steering wheel 210. In an example, the TOS 218 may receive steering information from one or more vehicle components. The TOS 218 may be communicatively coupled to a central vehicle control system 230 and/or be a part of the central vehicle control system 230 to receive information from one or more vehicle components. Additionally or alternatively, the TOS 218 may determine or measure steering information. In an example, steering information may include a speed of the vehicle, an angle or position of the steering wheel 210, a manual torque exerted on the steering wheel 210 and on the steering column 212, a rotational speed of the steering wheel 210, route information, location of the vehicle, driver information, stability information, traction information, etc.

For example, the TOS 218 and/or the central vehicle control system 230 may analyze the steering information to determine a TOS torque to apply to the steering column 212. Steering may then be assisted or dampened (in a variety of amplitudes) by running the TOS 218. For example, the TOS 218 may assist or dampen rotational movement of the steering column 212 (by applying TOS torque in either direction), or may assist or dampen translational movement of the rack 214 (by applying force on the rack 214 in either direction). Thus, the TOS 218 may independently assist and/or dampen vehicle steering by applying force to the steering column 212 and/or rack 214.

In addition to the TOS 218, the pump control system 206 may include a power steering gear 220 to provide additional steering assistance to lessen the amount of torque required to be applied either manually by the driver or by the TOS 218. The pump control system 206 may assist vehicle steering by applying hydraulic pressure to a power steering gear 220. The hydraulic pressure may be provided by a hydraulic pump 228, fluidly coupled to the power steering gear 220. In an alternative example, the hydraulic pressure may be provided by an electric pump 228 coupled to the power steering gear 220. In an example, the pump 228 may be used to supplement the manual torque provided by the driver and/or TOS torque applied to the steering column 212 by the TOS 218.

In an example, the pump 228 may be capable of varying its speed to vary an amplitude or value of hydraulic pressure provided to the power steering gear 220. In examples, the speed of the pump 228 may range between zero and a maximum speed (e.g., 5 HP). In another example the speed of the pump may be independent of whether the vehicle is on. Thus, the pump 228 may be off (e.g., not pumping hydraulic fluid and not providing hydraulic pressure to the steering gear, thus not providing steering assistance) even while the vehicle is on and/or moving. The amplitude or value of the hydraulic pressure applied to the power steering gear 220 may correlate with a magnitude of steering assistance. For example, a higher hydraulic pressure applied to the power steering gear 220 may correlate with greater steering assistance by applying increased force to the steering column 212 (i.e., rotational force) and/or applying increased force to the rack 214 (i.e., translational force). In another example, when no power is provided to the motor 226 and the speed of the pump 228 is zero, there may be no hydraulic pressure applied to the power steering gear 220 and no steering assistance provided by the power steering gear 220.

As described above, the TOS 218 and the power steering gear 220 may independently provide steering assistance. Alternatively, when TOS 218 utilizes an electric motor to provide TOS torque, the electric motor of the TOS 218 may be the same or different from the motor 226 powering the pump 228. In a further example, the electric motor of the TOS 218 may be used to adjust the power provided by the motor 226 (e.g., a variable pump motor) powering the pump 228. In another example, the TOS 218 may be included as a component of the power steering system including the motor 226, pump 228, and power steering gear 220. In an example where the TOS 218 and the power steering gear 220 independently provide steering assistance, the TOS 218 may independently provide sufficient steering assistance to turn the wheels 202, without input at the power steering gear 220. In another example, the power steering gear 220 may independently provide sufficient steering assistance to turn the wheels 202, without input at the TOS 218. In yet a further example, both the TOS 218 and the power steering gear 220 may be required or desired to provide steering assistance to sufficiently turn the wheels 202.

The motor 226 may provide power to the hydraulic pump 228 to apply hydraulic pressure to the power steering gear 220, based on the speed of the pump. As described herein, the motor 226 may be shared with the TOS 218 to independently, electrically provide steering assistance. In an example, the motor 226 may be an electrical motor 226 powering a hydraulic pump 228. The motor 226 may be powered by a power generator 222. The power generator may be any power source, such as an electric battery, an engine (e.g., through a power take off engagement), etc. The power generator 222 may be capable of recharging to continue to provide and generate power. An amount of power received by the motor 226 from the power generator 222 may be controlled by an electronic control unit ("ECU") 224, or processor, or pump motor controller. The ECU 224 may be configured to control a power supplied to the motor 226 to control the speed of the pump 228, the associated hydraulic power provided to the power steering gear, and the pump torque applied to the steering column 212 by the power steering gear. Thus, the ECU 224 may be configured to electrically couple to the power generator 222 and the motor 226.

In examples, the ECU 224 may receive or obtain steering information from the TOS 218 and/or the central vehicle control system 230 (e.g., the ECU 224 may be a separate processor from, and communicatively coupled to, the TOS 218 and/or the central vehicle control system 230). Alternatively, the ECU 224 may be a component of the central vehicle control system 230. The steering information may be automatically received by the ECU 224 as new steering information is collected, measured, or determined. As another example, the steering information may be periodically received and/or updated by the ECU 224 at predetermined intervals and/or thresholds. For example, the steering information may be received at a frequency of 500 ms, or other intervals less than one second. As another example, the steering information may be sent to the ECU 224 after a threshold change in the steering information, such as a change in a plurality of values associated with the steering information (e.g., a change in a speed of the vehicle and a change in a position of the steering wheel 210) or a change in one value that meets or exceeds a corresponding threshold value (e.g., an angle of rotation of the steering wheel 210 exceeding 5 degrees). In a further example, the frequency that steering information is sent to, or retrieved by, the ECU 224 may increase or decrease while a threshold is exceeded, or after a threshold change in the steering information is met (e.g., steering information is sent at a frequency of one second until a threshold is met and the frequency may be increased to less than a second until a second threshold is met).

Based on the steering information received from the TOS 218 and/or the central vehicle control system 230, the ECU 224 may determine a pump torque to apply to the steering column 212 to assist in steering the vehicle. The determined pump torque to be applied to the steering column 212 may be associated with a power to provide the motor 226 and/or a speed of the pump 228. Additionally or alternatively, the power to provide the motor 226 and/or a speed of the pump 228 may be directly determined based on the steering information. In an example, the ECU 224 may determine a power to provide the motor 226 based on the steering information. In another example, the ECU 224 may determine a speed of the pump 228 based on the steering information and then determine an associated power to provide the motor 226, based on the determined speed. The ECU 224 may be calibrated to correlate to, or be associated with, one or more of: a pump torque applied to the steering column 212 by the power steering gear 220, a power to provide the motor 226, and a speed of the pump 228 (together, the "ECU parameter(s)").

The ECU 224 may determine one or more of the ECU parameters based on a set of rules. For example, the ECU 224 may determine the necessary ECU parameter(s) to maintain a constant amount of force required on the steering wheel 210 to turn the vehicle. As another example, the ECU 224 may adjust the ECU parameter(s) to maintain a relationship between force required on the steering wheel 210 to turn the vehicle and position of the steering wheel 210. Adjusting steering assistance by varying one or more ECU parameter(s) may reduce steering control issues resulting from lashes in input at the steering wheel 210 (e.g., a spike or dip in resistive force at the steering wheel 210). For example, the further the steering wheel 210 is rotated (e.g., a larger angle of rotation off of a center position), the ECU may adjust one or more ECU parameter(s) to require less force may be required by the driver on the steering wheel 210 to turn the wheels 202. As another example, if the steering information includes an indication that crosswinds are present, then the ECU 224 may adjust the ECU parameter(s) to require less force to turn the steering wheel 210 in one direction of rotation and/or dampen the opposite direction of rotation. As a further example, the ECU 224 may adjust the ECU parameter(s) to provide more or less steering assistance as required or desired. For example, the wheels 202 may need less force to turn when the speed of the vehicle is increased, and thus the ECU 224 may correspondingly change the ECU parameter(s). As another example, the wheels 202 may need more force to turn when the vehicle is on uneven surfaces or on a surface that is not level, and thus the ECU 224 may correspondingly change the ECU parameter(s).

In another example, a first set of steering information may be associated with a slow speed of the vehicle and a zero, or centered, position of the steering wheel 210 (e.g., the driver has not turned the steering wheel 210). The ECU 224 may determine a first ECU parameter, based on the first set of steering information (e.g., a first power provided to the motor 226, a first speed of the pump 228, and/or a first pump torque applied to the steering column 212). As a further example, the ECU 224 may receive a second set of steering information that may be associated with the same, slow speed of the vehicle and a non-zero, or off-center, position of the steering wheel 210 (e.g., a driver has rotated the steering wheel 210 by an angle of rotation). The ECU 224 may determine a second ECU parameter, based on the second set of steering information (e.g., a second power provided to the motor 226, a second speed of the pump 228, and/or a second pump torque applied to the steering column 212). In this example, there may be an increase in value between the first ECU parameter and the second ECU parameter (i.e., the second ECU parameter may be higher than the first ECU parameter), because more steering assistance may be required or desired for the second set of steering information.

In another example, the ECU 224 may receive a third set of steering information that may be associated with a higher speed of the vehicle and the same, non-zero, or off-center, position of the steering wheel 210 as received in the second set of information. The ECU 224 may determine a third ECU parameter, based on the third set of steering information (e.g., a third power provided to the motor 226, a third speed of the pump 228, and/or a third pump torque applied to the steering column 212). In this example, the third ECU parameter may be higher than the first ECU parameter and lower than the second ECU parameter, because the amount of steering assistance required or desired may decrease with the increased speed of the vehicle. Adjusting the ECU parameter(s) based on steering information or a set of steering information may enhance driver comfort, reduce fatigue, and lower the energy consumption of the pump control system 206. Thus, the ECU 224 may adjust the ECU parameter(s) for a variety of conditions, as determined from the steering information.

Additionally, determination of the ECU parameter(s) by the ECU 224 based on the steering information may be variable and/or customizable, based on parameter adjustment information. Parameter adjustment information may include a driving mode, a driver characteristic, route data, or other information related to steering assistance preferences related to a driver and/or route. In an example, the ECU 224 may determine ECU parameter(s) from both the steering information and the parameter adjustment information. For example, the steering information may include the adjustment parameter information. In another example, the ECU 224 may determine ECU parameter(s) based on the steering information, and then adjust the value of the determined ECU parameter(s) based on the parameter adjustment information. For example, the steering information may be received separately from the parameter adjustment information. As another example, the steering information may be received from the TOS 218 and the parameter adjustment information may be received from the central vehicle control system 230.

For example, the ECU 224 may determine values for ECU parameter(s) based on the steering information and a selected driving mode. In an example, a driving mode may be associated with a steering stiffness (i.e., an amount of force required to rotate the steering wheel 210). In another example, the driving mode may be associated with a varying steering stiffness as a function of steering information (e.g., position of the steering wheel 210, a speed of the vehicle, pump torque applied to the steering wheel 210 over a period of time, etc.). The driving mode may be selected automatically based on preferences stored for a driver and upon identifying a driver of the vehicle (e.g., a key associated with a driver, a seat position, other adjustable vehicle settings, a selectable control, or other mechanisms of identifying a driver). Additionally or alternatively, the driving mode may be manually selected by the driver through a switch or other interface provided within the vehicle.

As another example, the ECU 224 may determine a value for ECU parameter(s) based on the steering information and a driver characteristic. A driver characteristic may include driver aggressiveness, driver turn speed, driver following distance, or any other characteristic specific to a unique driver that may impact an amount of steering assistance to be provided at the power steering gear 220. The driver characteristic may be self-selected by the driver through an interface provided in the vehicle or in a mobile application communicatively connected to the vehicle. Alternatively, the driver characteristic may be derived automatically by analysis of telematics data collected by the vehicle and associated with the driver. In an example, the ECU parameter(s) may be increased or decreased based on the driver characteristic.

As a further example, the ECU 224 may determine values for ECU parameter(s) based on the steering information and route data. Route data may be manually provided by a driver of the truck and/or may be determined using machine learning based on past location information. In an example, the ECU 224 and/or central vehicle control system 230 may anticipate that the vehicle is nearing a turn (e.g., based on a route and a vehicle location along the route). In response to anticipating a turn, the ECU 224 may increase ECU parameter(s) (thus increasing steering assistance) prior to the turn. Thus, the ECU 224 may adjust the ECU parameter(s) in anticipation of a change in steering assistance in addition to, or an alternative to, reacting to changes in steering information.

The value associated with the ECU parameter(s) and/or the variation and/or customization of the value may be determined from the steering information based on a feedback loop, predetermined threshold and/or function, or using machine learning. The determination of the value and/or variation or customization of the value may by applicable over an indefinite time or may be applied to a specific period of time. For example, steering information related to a certain period of time (e.g., weather information, a sustained angle or position of the steering wheel 210 information, steering wheel 210 stability information, traction information, ground or surface information, etc.) may be used to determine the value until the steering information is no longer applicable (e.g., wind changes direction, vehicle changes direction relative to the wind, a break in a sustained angle or position of the steering wheel 210, steering wheel 210 stability changes, traction changes, a surface becomes level, etc.). As another example, parameter adjustment information applicable for a certain period of time (e.g., specific driving mode, specific driver, specific route, etc.) may be applied until the parameter adjustment information no longer applies (e.g., a new driving mode is selected or determined, the driver changes, the route terminates or pauses, etc.).

As shown, the TOS 218 and/or the central vehicle control system 230 may send steering information and/or parameter adjustment information to the ECU 224. An power generator 222 may be electrically coupled to the TOS 218 and/or the ECU 224 to power the TOS 218 and/or the ECU 224. The power generator 222 may be the battery used to power the vehicle (e.g., battery used to power the starter, etc.), or a battery different from that powering the vehicle. The electrical coupling mechanism between the power generator 222 and the TOS 218 and/or the pump motor controller 224 may allow the electric battery to be removed from the system 200 and/or replaced.

The ECU 224 may then determine a set of ECU parameter(s) based on the steering information and/or parameter adjustment information. The set of ECU parameter(s) may include one or more ECU parameter(s), and may comprise, for example, a power to be provided to the motor 226. The ECU 224 may then provide the determined power to the pump motor 2 via an electrical coupling with the power generator 222.

The power received by the motor 226 may be converted into mechanical energy to power the power steering pump 228. The power received by the motor 226 may be associated with a speed of the power steering pump 228. In an example, there may be no power provided to the motor 226 (i.e., the pump speed may be zero) when the power generator 222 is on and powering other components of the vehicle. For example, the power generator 222 may power the TOS 218 without providing power to the ECU 224 (as determined by the ECU 224).

The speed of the power steering pump 228 may be further associated with an amount of steering assistance provided to the steering column by the steering gear 220. The amount of steering assistance provided to the steering column by the steering gear 220 may be sent, detected, or measured by the TOS 218 and/or central vehicle control system 230. An indication of the amount of steering assistance provided by the steering gear 220 may be included in the steering information received by the ECU 224. Thus, the ECU 224 may update or change ECU parameter(s) based on a feedback loop where the steering information is updated based on steering assistance provided by the steering gear 220.

Figure 3:
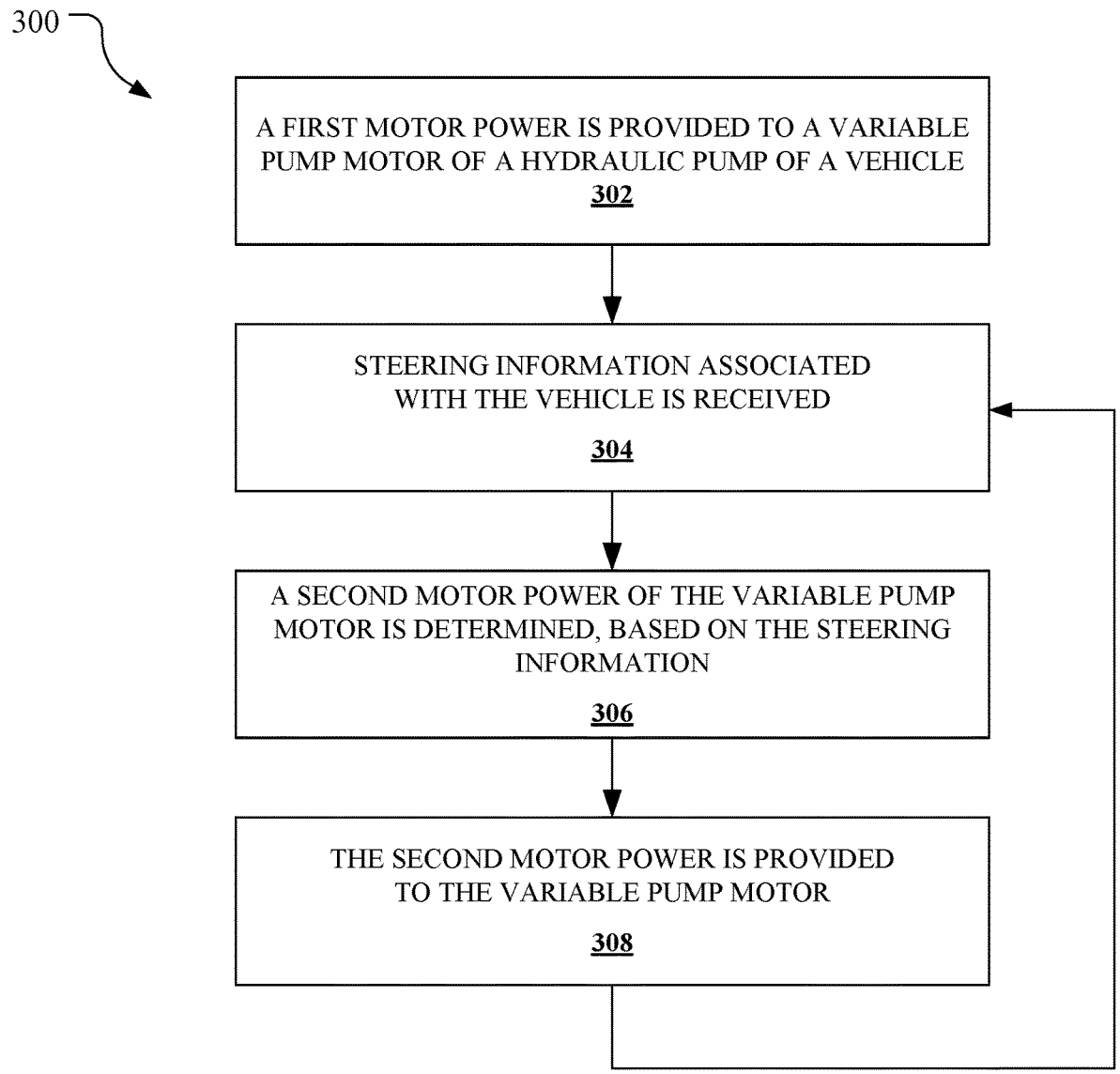
FIG. 3 depicts an example method for varying power provided to a motor associated with power steering of a vehicle.
Figure 4:
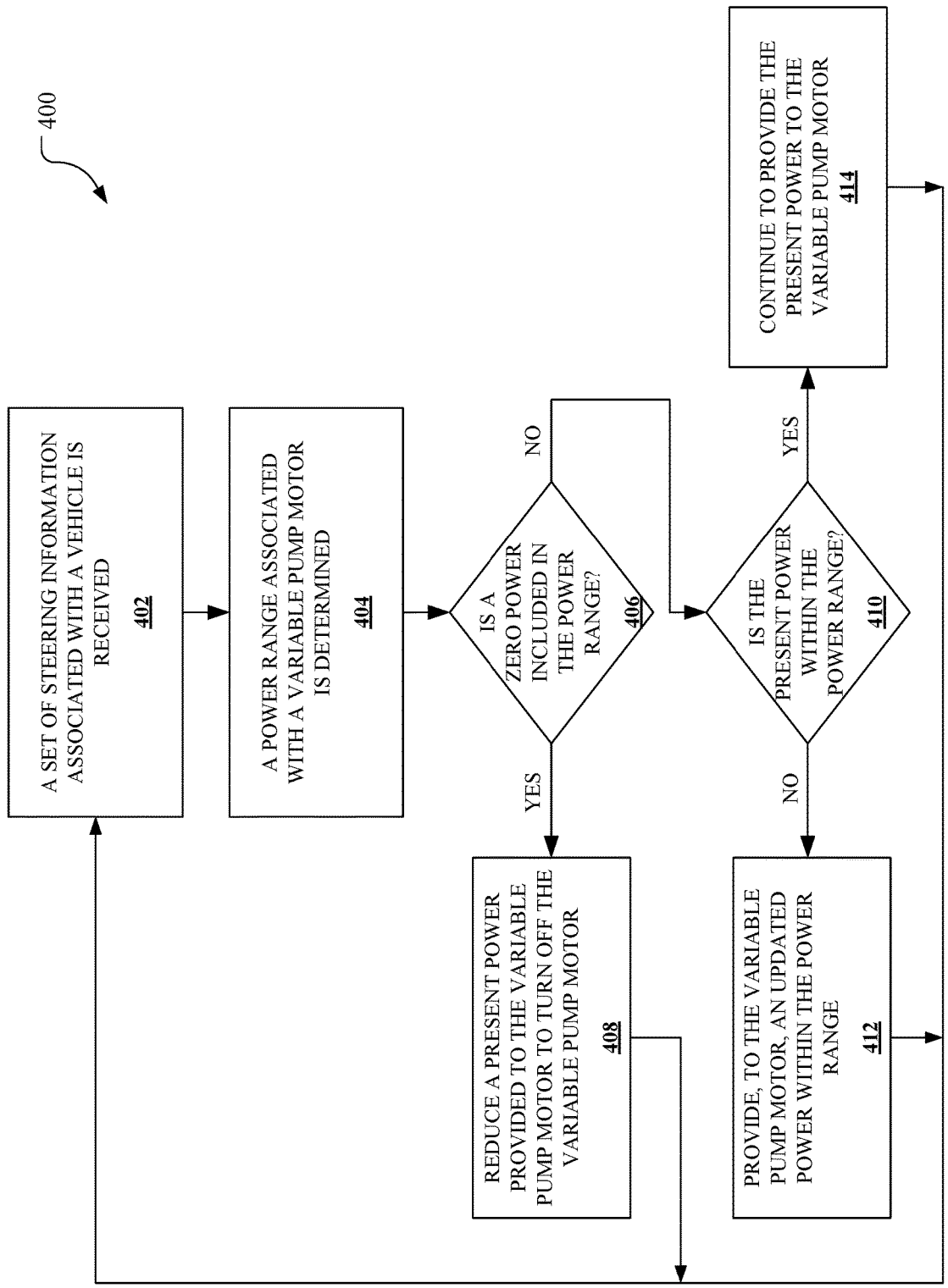
FIG. 4 depicts another example method for varying power provided to a motor associated with power steering of a vehicle.

FIGS. 3 and 4 depict example methods according to the present technology. The example methods include operations that may be implemented or performed by the systems and devices disclosed herein. For example, the vehicle 100 depicted in FIG. 1 and/or system 200 depicted in FIG. 2 may perform the operations described in the methods. As a further example, the ECU 224 in system 200 may perform the operations disclosed herein. In addition, instructions for performing the operations of the methods disclosed herein may be stored in a memory of ECU/pump motor controller (e.g., system memory 504 described in FIG. 5).

FIG. 3 depicts an example method 300 for varying power provided to a motor (e.g., motor 226) associated with power steering of a vehicle (e.g., vehicle 100). At operation 302, a first motor power is provided to a motor. For example, a control unit (e.g., ECU 224) of the vehicle may provide a first motor power to a variable pump motor of a hydraulic pump of the vehicle. The first motor power may be provided from a power generator electrically coupled to the control unit and the variable pump motor. The first motor power may be predetermined, such as from past steering information, startup rules, selected by a driver, etc.

At operation 304, steering information is received. For example, the control unit may receive, from a torque overlay system (e.g., TOS 218), a first set of steering information associated with the vehicle. Examples of steering information are further described herein and a set of steering information may comprise, in examples, one or more parameter values. In examples, steering information may also be received from a central vehicle control system (e.g., central vehicle control system 230). The control unit may also receive parameter adjustment information, as described herein. The steering information may be received contemporaneously with the parameter adjustment information or may be received at a different time.

At operation 306, a second motor power is determined. For example, the control unit may determine a second motor power of the variable pump motor, based on the first set of steering information. If parameter adjustment information is also received, then the control unit may determine the second motor power based on both the steering information and the parameter adjustment information. Alternatively, the control unit may determine the second motor power based only on the steering information and then adjust the second motor power based on the parameter adjustment information. The second motor power may be different from the first motor power. The first motor power and/or the second motor power may be zero.

At operation 308, the second motor power is provided to the motor. For example, the control unit may provide the second motor power to the variable pump motor from the power generator. The second motor power may be provided to the variable pump motor directly from the power generator. For example, the control unit may control a power regulator electrically coupled with the power generator and the variable pump motor. The regulator may be configurable to control the power delivered to the variable pump motor. In another example the second motor power may be provided to the variable pump motor indirectly from the power generator. For example, the power generator may power the control unit, which may then power the variable pump motor.

Operations 304-308 may repeat when the control unit receives additional or update steering information and/or additional or update parameter adjustment information. For example, the control unit may receive a second set of steering information associated with the vehicle, determine a third motor power based on the second set of information, and provide the third motor power to the variable pump motor.

FIG. 4 depicts another example method 400 for varying power provided to a motor (e.g., motor 226) associated with power steering of a vehicle (e.g., vehicle 100). At operation 402, steering information is received. For example, a control unit (e.g., ECU 224) of a vehicle may receive, from a torque overlay system (e.g., TOS 218), a set of steering information associated with the vehicle. Operation 402 may be similar to operation 304 of FIG. 3.

At operation 404, a power range is determined. For example, the control unit of the vehicle may process the set of steering information to determine a power range associated with a variable pump motor of the vehicle. Alternatively, the vehicle may process the set of steering information to determine a value range for ECU parameter(s) (e.g., power provided to the motor, speed of the pump, or pump torque applied to the steering column). In an example, the range may include only one value. Alternatively, the range may include a set of values bounded by a lower threshold and an upper threshold. The lower threshold and the upper threshold may be determined based on an error associated with steering assistance from a determined value. Additionally, the lower threshold may have a minimum value of zero and the upper threshold may have a maximum value based on a maximum speed of the pump. Additionally or alternatively, processing the set of steering information to determine the range may include machine learning and/or predetermined rules. In another example, determining a power range or range for values of ECU parameter(s) may include processing adjustment parameter information.

At determination 406, a zero power is determined to be in the power range. For example, the control unit may determine if a zero power is included in the power range determined at operation 404. In examples, the determination is a binary determination (e.g., whether zero is or is not included in the range) or may be based on a threshold (e.g., whether zero is an upper threshold or a lower threshold of the range). If it is determined that a zero power is included in the range (e.g., indicating that no additional steering assistance is required or desired by the power steering gear), flow branches "YES" and progresses to operation 408. At operation 408, the present power is reduced. For example, the control unit may reduce a present power (e.g., the power presently or currently being provided to the motor) provided to the variable pump motor to turn off the variable pump motor. In an example, the control unit provides no power to the motor or stops providing power to the motor. Alternatively, the control unit may reduce the power provided to the motor to a minimum power. In an example, the minimum power may reduce the pump speed to zero and apply no pump torque to the steering column from the steering gear.

If, however, it is determined that the power range does not include zero (e.g., indicating that steering assistance is required or desired, such that a power greater than zero is required or desired), flow branches "NO" to determination 410. At determination 410, a present power is determined to be in the power range. For example, the control unit may determine if the present power is within the determined power range. In examples, the determination is a binary determination (e.g., whether the present power does or does not fall within the power range) or may be based on a threshold (e.g., whether the present power is close to the power range). If it is determined that the present power is not within the power range, flow branches "NO" and progresses to operation 412. At operation 412, an updated power is provided. For example, the control unit may provide an updated power that is within the determined power range to the variable pump motor. In an example, the control unit may adjust or change the power provided to the variable pump motor to increase or decrease the power, based on the present power and the determined power range. The change or adjustment in the provided power may be based on an upper or lower threshold of the power range, or a predetermined value within the power range (e.g., the median or average power within the power range). For example, if the present power is above the power range, the updated power may be less than the present power and may be decreased to the upper threshold, the lower threshold, the average within the power range, or any other value falling within the power range.

If, however, it is determined that the present power falls within the power range, flow branches "YES" to operation 414. At operation 414, the present power continues to be provided. For example, the control unit may continue to provide the present power to the variable pump motor. Alternatively, the present power may be adjusted within the power range. For example, if the present power may be decreased to a lower threshold of the power range or increased to an upper threshold of the power range. In an example where the power range includes only one value, the control unit may continue to provide the present power if the present power is the one value in the power range.

Operations 402-414 may repeat as the control unit continually or periodically receives additional sets of steering information and/or adjustment parameter information from the torque overlay system and/or central vehicle control system.

Figure 5:
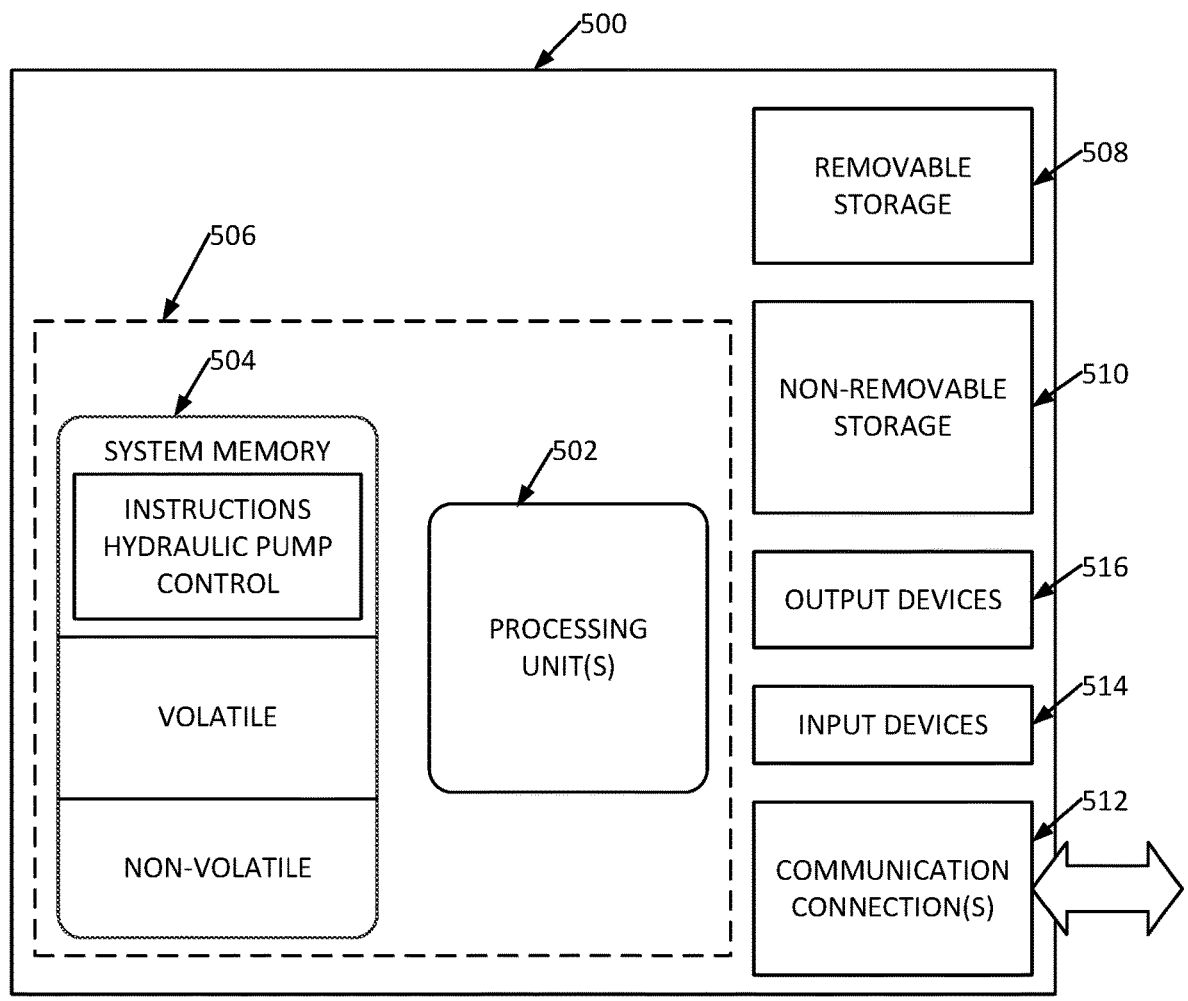
FIG. 5 depicts an example of a suitable operating environment in which one or more of the present embodiments may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, operating environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIGS. 3 and 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although aspects of the disclosure describe a vehicle manually steered and/or controlled by a driver, it should be appreciated these concepts may be applied to an autonomous or semi-autonomous vehicle. For example, it should be appreciated that aspects of the disclosure may apply to any pump that provides power to a steering system of any type of vehicle, whether or not a steering wheel and/or driver is present.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

What is claimed is:

1. A system for varying a power provided to a hydraulic pump of a vehicle, the system comprising:
    a steering column comprising a torque overlay system;
    a variable pump motor hydraulically coupled to a hydraulic pump, the hydraulic pump configured to provide fluid to a power steering system;
    a power generator;
    a processor communicatively coupled to the torque overlay system; and
    memory storing instructions, that when executed by the processor, cause the system to perform a set of operations comprising:
        receiving, from the torque overlay system, a first set of steering information;
        determining a first motor power of the variable pump motor, based on the first set of steering information; and
        causing the first motor power to be provided to the variable pump motor from the power generator.

2. The system of claim 1, the set of operations further comprising:
    receiving, from the torque overlay system, a second set of steering information;
    determining a second motor power of the variable pump motor, based on the second set of steering information; and
    causing the second motor power to be provided to the variable pump motor from the power generator, wherein the second motor power is different from the first motor power.

3. The system of claim 2, the set of operations further comprising:
    receiving, from the torque overlay system, a third set of steering information;
    determining not to power the variable pump motor, based on the third set of steering information; and
    preventing powering of the variable pump motor.

4. The system of claim 1, wherein the first set of steering information comprises at least one of:
    a speed of the vehicle;
    an angle of rotation of a steering wheel of the vehicle;
    a manual torque applied to the steering column from the steering wheel; or
    a rotational speed of the steering wheel.

5. The system of claim 4, wherein the first set of steering information comprises the speed of the vehicle, and wherein the first motor power increases as the speed decreases.

6. The system of claim 4, wherein the first set of steering information comprises the angle of rotation of the steering wheel, and wherein the first motor power increases as the angle of rotation increases.

7. The system of claim 4, wherein the first set of steering information comprises the manual torque applied to the steering wheel, and wherein the first motor power increases as the manual torque increases.

8. The system of claim 1, wherein the processor is electrically coupled to the power generator and the variable pump motor.

9. A method of varying a speed of a hydraulic pump in a vehicle, the method comprising:
    causing a first motor power to be provided to a variable pump motor of a hydraulic pump of a vehicle from a power generator of the vehicle;
    receiving, from a torque overlay system, a first set of steering information associated with the vehicle;
    determining a second motor power of the variable pump motor, based on the first set of steering information; and
    causing the second motor power to be provided to the variable pump motor from the power generator, wherein the second motor power is different from the first motor power.

10. The method of claim 9, wherein the first motor power and the second motor power are provided while the power generator of the vehicle is on.

11. The method of claim 10, wherein the second motor power is zero.

12. The method of claim 9, wherein the first set of steering information comprises at least one of:
    a speed of the vehicle;
    an angle of rotation of a steering wheel of the vehicle;
    a manual torque applied to the steering column from the steering wheel; or
    a rotational speed of the steering wheel.

13. The method of claim 9, wherein the vehicle is an electric truck and the power generator is an electric battery.

14. The method of claim 9, further comprising:
    receiving, from the torque overlay system, a second set of steering information;

determining a third motor power of the variable pump motor, based on the second set of steering information; and causing the third motor power to be provided to the variable pump motor from the power generator.

15. The method of claim 9, wherein determining a second motor power comprises identifying the second motor power based on a set of pre-determined rules.

16. The method of claim 15, further comprising:
updating the set of pre-determined rules based on the first set of steering information.

17. A vehicle capable of varying a speed of a hydraulic pump, the vehicle comprising:
a front axle coupled to a wheel;
a power generator;
a steering column coupled to the front axle comprising a torque overlay system;
a variable pump motor hydraulically coupled to a hydraulic pump, the hydraulic pump configured to provide fluid to a power steering system;
a processor communicatively coupled to the torque overlay system; and
memory storing instructions, that when executed by the processor, cause the system to perform a set of operations comprising:
causing a first motor power to be provided to the variable pump motor from the power generator;
receiving, from the torque overlay system, a set of steering information;
determining a second motor power of the variable pump motor, based on the set of steering information; and
causing the second motor power to be provided to the variable pump motor from the power generator, wherein the second motor power is different from the first motor power.

18. The vehicle of claim 17, wherein the set of operations is performed when the power generator of the vehicle is on, and wherein the first motor power is zero.

19. The vehicle of claim 17, wherein the processor is electrically coupled to the power generator and the variable pump motor.

20. The vehicle of claim 17, wherein the vehicle is an electric truck and the power generator is a battery.

* * * * *